Patented June 6, 1939

2,161,710

UNITED STATES PATENT OFFICE 2,161,710

MANUFACTURE OF ABSORPTIVE MATERIALS

Karl Jaeger, Bitterfeld, Germany, assignor to I. G. Farbenindustrie Aktiengesellschaft, Frankfort-on-the-Main, Germany No Drawing. Application March 25, 1937, Serial No. 132,974. In Germany April 2, 1936

5 Claims. (Cl. 252—2)

It is known that by the action of strong acids, such as sulfuric acid, chlorsulfonic acid or phosphoric acid, or of zinc chloride or acid salts on organic materials, for example wood, brown coal, coal and the like, bodies are obtained which are highly absorptive and exhibit cation exchange properties.

This invention is based on the observation that substances with exceptionally good exchange and filtering properties are obtained if the coal is treated with sulfuric acid, fuming sulfuric acid or the like, especially with the mild but powerful amidosulfonic acid, in the presence of a catalyst. The most suitable catalysts are sulfonating catalysts, for example mercury salts, in part combined with oxidizing agents such as potassium bichromate or the like, and also those which in addition have a condensing effect, such as boric acid or the like. The use of the catalysts permits activation or sulfonation at a relatively low temperature. An advantage of the invention lies in the fact that the products have a higher capacity for exchange, give colorless, clear filtrates and are produced for the greater part in coarse-grained condition. These properties can be yet further improved especially when the raw material is coal or anthracite, if the appropriate activation process is preceded by treatment with organic solvents or swelling agents. It is of especial advantage to sulfonate in the presence of a catalyst with portions of acid of increasing concentration. Another useful method is to saturate gradually the organic substance (coal etc.), mashed with the catalyst or mixture of catalysts, with gases from the contact process of making sulfur trioxide, the rise in temperature being regulated. The temperature may be limited, in this novel process, to about 150° to 160° C.; this ensures that the product, after separating the excess acid, will no longer part with constituents soluble in water or acid to the filtrate.

The invention is illustrated by the following examples.

Example 1.—50 kilos of anthracite from which the fines have been separated together with 50 grams of mercury sulfate and 3 kilos of potassium bichromate are treated in a cast iron container, provided with means for heating and cooling, with 270 kilos of fuming sulfuric acid containing 20 per cent. of $SO_3$; 180 kilos of fuming sulfuric acid containing 65 per cent. of $SO_3$ are then added gradually. The temperature is allowed to rise slowly to 150° C. and is maintained for about 2 to 3 hours at this value. After the mixture has been allowed to settle and cool, the excess acid, which may be used for a fresh charge, is drawn off and the solid, partially disintegrated product is introduced into water. It is then washed and classified in fractions of various grain sizes by sieving. The component having a grain-size of between 0.2 and 0.4 mm. has a total exchange capacity with respect to calcium chloride solution of 7.5 per cent. CaO. The component with a grain-size larger than 0.4 mm. has a capacity lower by about one unit.

Example 2.—25 kilos of coal are sulfonated, under conditions similar to those described in Example 1, in the presence of 50 grams of mercury sulfate and of 1 kilo of boric acid with 12.5 kilos of fuming sulfuric acid of 20 per cent. strength and 11 kilos of fuming sulfuric acid of 65 per cent. strength, the temperature being limited to 140° C. The product is worked up as described in Example 1, washed and sieved. The fraction of 0.2 to 0.4 mm. size has an exchange capacity of about 7, and the coarser fraction of about 5, per cent. CaO. A corresponding charge without catalysts yields a product with an exchange value lying 1 to 2 units below the figures mentioned. If, on the other hand, one attempts to increase the activity by raising the temperature a product is obtained which usually, and especially during regeneration and during reversal of acid to slightly alkaline reaction, gives up a considerable quantity of colored organic matter to the filtrate.

The products obtained can be used for water-softening and the extraction of salts, for winning metals from very weak solutions, washing out alkali and the like.

What I claim is:

1. The process which comprises acting upon coal with a sulfonating agent of the group consisting of sulfuric acid, fuming sulfuric acid, $SO_3$ and amidosulfonic acid in the presence of a mercury catalyst and a member of the group consisting of boric acid and potassium bichromate.

2. The process which comprises acting upon anthracite with a sulfonating agent of the group consisting of sulfuric acid, fuming sulfuric acid, $SO_3$, and amidosulfonic acid in the presence of a mercury catalyst and a member of the group consisting of boric acid and potassium bichromate.

3. The process which comprises heating anthracite with fuming sulfuric acid slowly to a temperature of 150° C. in the presence of mercury sulfate and potassium bichromate.

4. The process which comprises heating anthracite with fuming sulfuric acid slowly to a temperature of 150° C. in the presence of mercury sulfate and boric acid.

5. The process which comprises treating 50 kilos of anthracite together with 50 grams of mercury sulfate and 3 kilos of potassium bichromate with 270 kilos of fuming sulfuric acid containing 20 per cent. of $SO_3$, adding gradually at a temperature up to about 150° C. 180 kilos of fuming sulfuric acid containing 65 per cent. of $SO_3$ and maintaining the temperature at 150° C. for about 2 to 3 hours.

KARL JAEGER.